Patented Nov. 7, 1922.

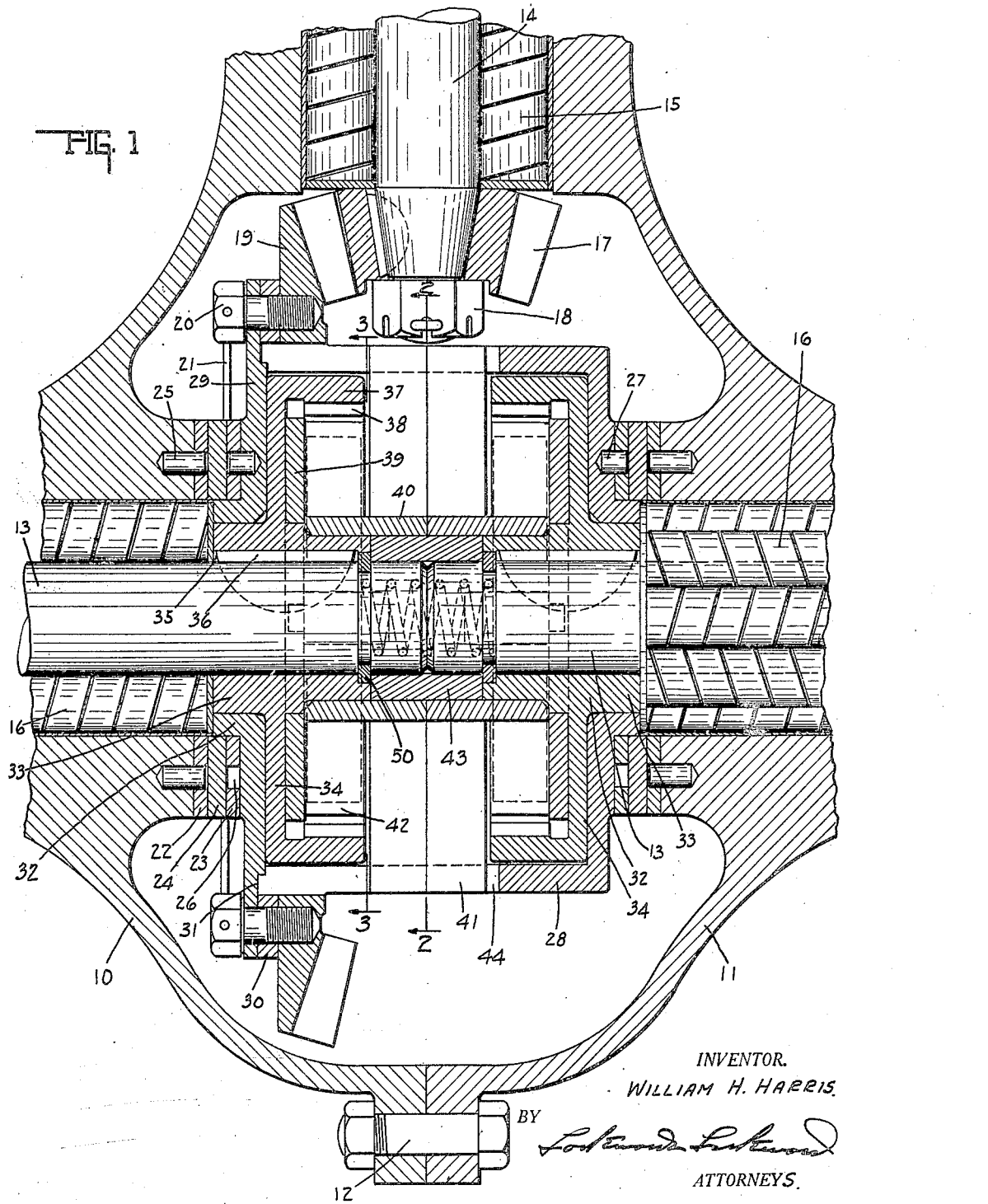

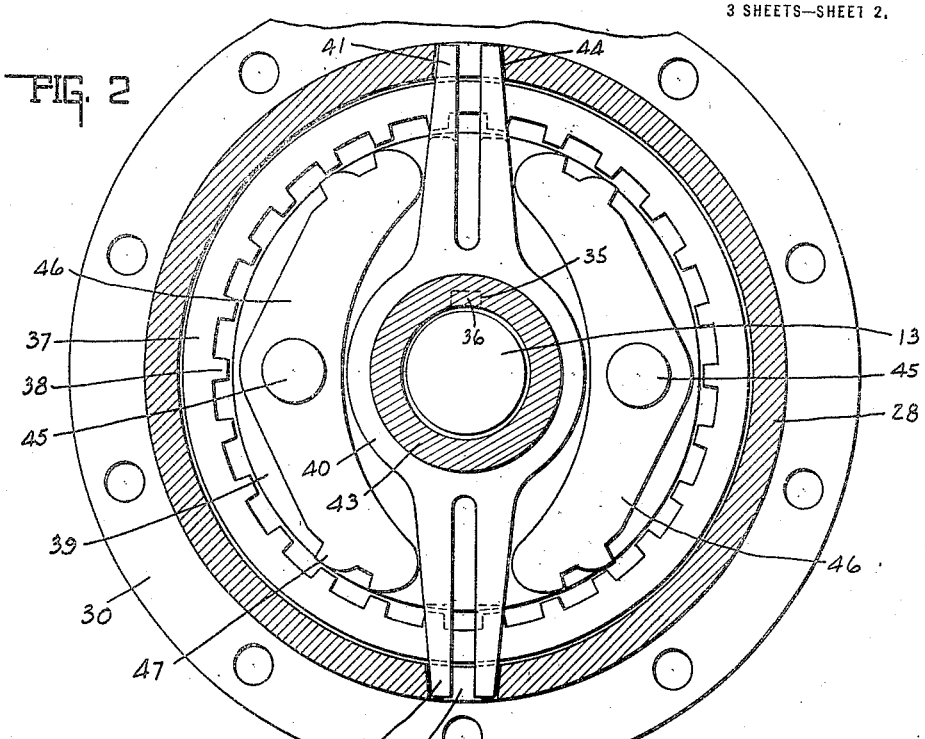
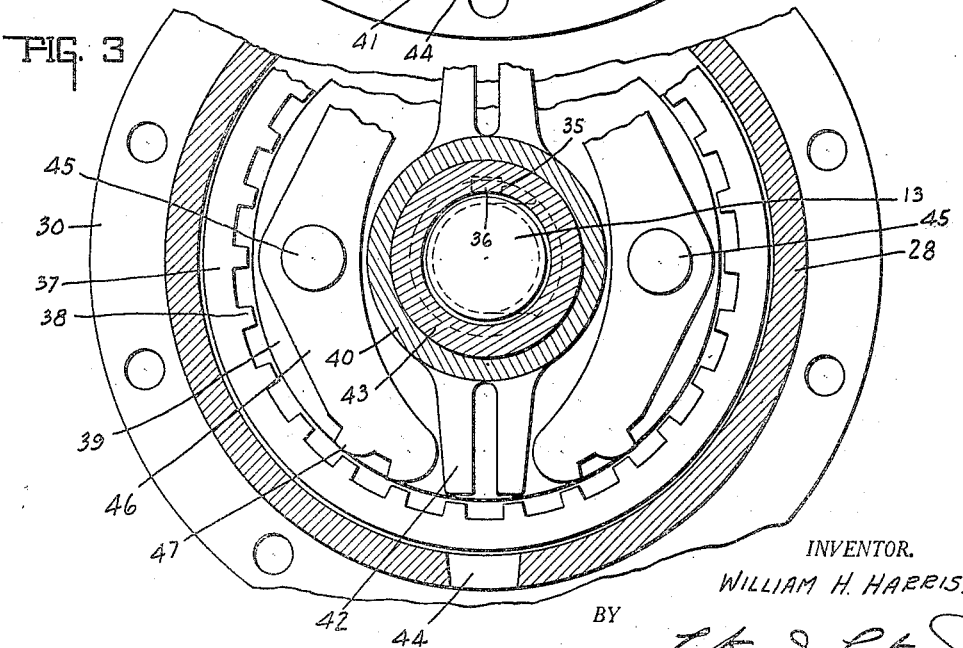

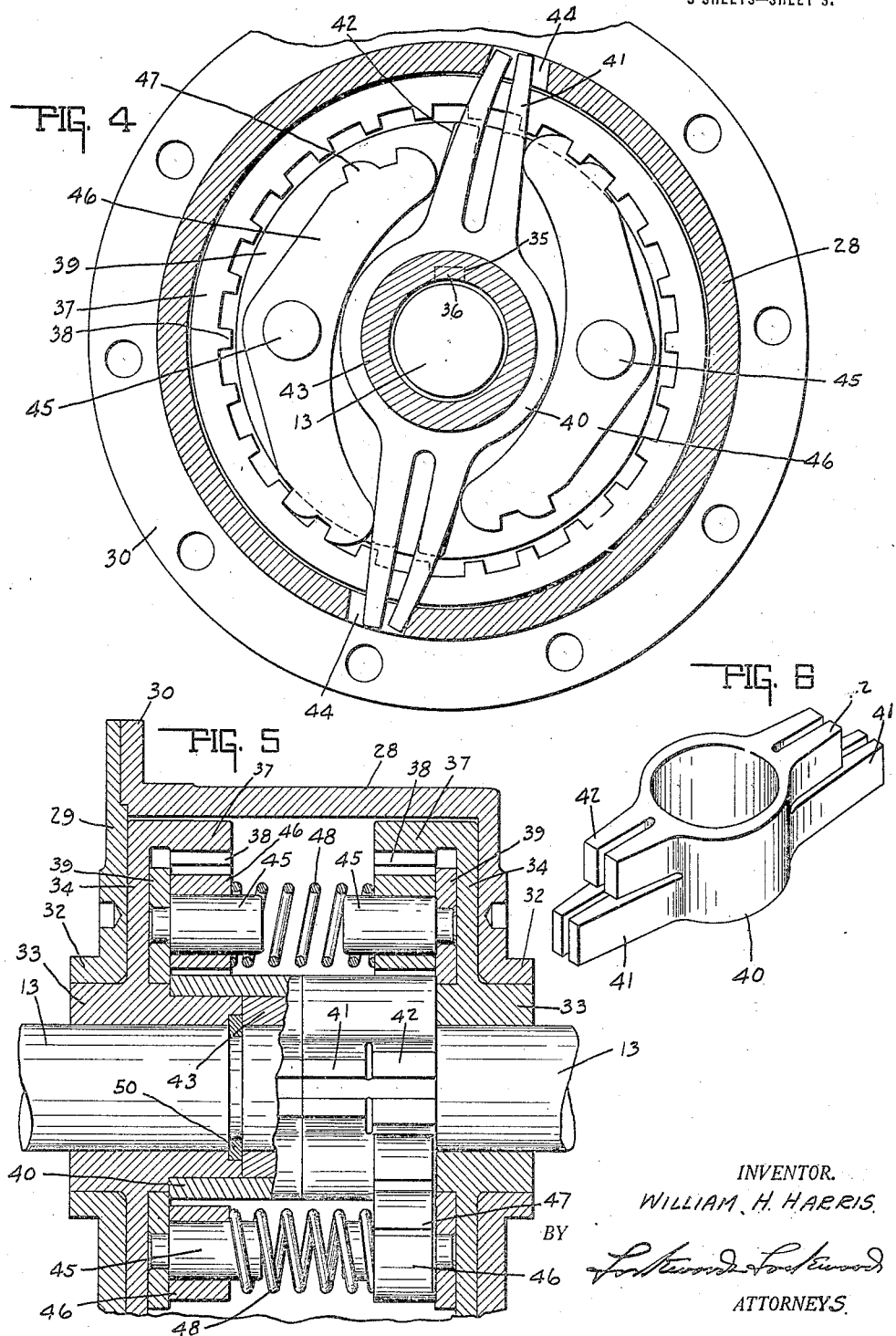

1,434,778

UNITED STATES PATENT OFFICE.

WILLIAM H. HARRIS, OF INDIANAPOLIS, INDIANA, ASSIGNOR OF ONE-FIFTH TO GEORGE W. MARTIN, OF CINCINNATI, OHIO.

DIFFERENTIAL DRIVE MECHANISM.

Application filed September 30, 1921. Serial No. 504,285.

*To all whom it may concern:*

Be it known that I, WILLIAM H. HARRIS, a citizen of the United States, and a resident of Indianapolis, county of Marion, and State of Indiana, have invented a certain new and useful Differential Drive Mechanism; and I do hereby declare that the following is a full, clear, and exact description thereof, reference being had to the accompanying drawings, in which like numerals refer to like parts.

This invention relates to differential driving mechanism for use with motor vehicles and the like, or with any other device or devices for which it is suitable, and arranged so that equalizing power will be transmitted constantly or intermittently to both driven members. In particular, this invention is an improvement upon the devices and structures shown in the co-pending applications, Serial No. 241,517, filed June 24, 1918, and Serial No. 365,457, filed March 13, 1920. It is well known that in the operation of automobiles and the like, power is not transmitted to both of the driven wheels at all times by the standard form of differential gear now employed. In straight-away driving either of the wheels is frequently in the air, due to road shock, and while in the air, since in the present type of differential the fast wheel takes the power, the wheel in engagement with the road loses power, since it is the slow wheel. Therefore, all the power generated and transmitted to the wheels is not applied as tractive power. In turning automobiles and the like, as at present constructed including the ordinary standard form of differential gearing,—the power is only transmitted to the outside wheel, and, therefore, the inside wheel drags. With the present invention, however, the ordinary complex differential gearing is dispensed with and power is capable of being applied at all times to both wheels, but to a variable degree according to the variation in the travel of said wheels, whereby a double traction effect is secured, and in particular power is applied directly to the slow moving wheel. Therefore, when a wheel is in the air, due to road shock, or the automobile is turning, the wheel in engagement with the road or the inside wheel when turning, respectively takes most of the power and uses the same for tractive effect. It has been experimentally determined that at least twenty-five per cent increased efficiency is secured by the substitution of the present differential drive mechanism for the standard differential gearing now employed in automobiles.

The chief feature of the invention consists in providing a differential drive mechanism for two driven members which is capable of permitting either of the two driven members connected and driven by said mechanism to revolve at different speeds. Further, said drive mechanism is adapted to permit either or both of said driven members to overrun the driving member. Further, said differential drive mechanism is adapted to reverse the direction of rotation of the driven members; and still further said differential drive mechanism is adapted to permit either or both of the driven members, when reversely rotated, to overrun the driving member when necessary.

Another feature of the invention consists in combining certain driving members which may include a yielding driving connection in such a manner that power will be transmitted to the driven members with a differential action within a reasonable limit of variation, which when exhausted, is provided for by other means, permitting the ordinary differential action.

Another feature of the invention is that the aforesaid yielding construction constitutes a cushioned drive which absorbs minor road shocks and proportions the power applied to the wheels to the tractive power required to propel both of the driven wheels of an automobile at the same speed the aforesaid inequalities transmitted to the differential driving mechanism and absorbed thereby are not transmitted to the power mechanism of the motor vehicle. It has been experimentally determined that an automobile equipped with the present invention when driven at a high rate of speed does not "jump" or pulsate, as is customary with the same vehicle equipped with the usual differential device. And furthermore, the aforesaid cushioning action developed by the present invention reduces vibration in the motor vehicle to a minimum.

To the foregoing ends there is combined with a pair of axially aligned driven members a driving member from which power is transmitted to the driven members through a yielding construction if desired. Adjacent to each of the driven members are positioned two kinds of dogs, arranged so that one kind of dog will be actuated at one time for driving in a forward direction and the other kind will be actuated when reverse driving is desired, said dogs and said driven members being suitably constructed so that the parts will ratchet when the differential action requires the same, in addition to the yielding or cushioning differential action of the yielding means when the latter is employed.

A further feature of the invention is to construct the parts thereof such that when the same are assembled, they will be compactly arranged; and a further feature of the invention is to construct the entire invention in a manner that the same may be applied to standard motor vehicles and may utilize the usual differential housing, driving pinion, ring gear meshing therewith and the usual axles and bearings.

The full nature of the invention will be understood from the accompanying drawings and the following description and claims.

In the drawings, Fig. 1 is a central cross sectional view of a standard differential housing, axles and driving gears and the invention associated therewith. Fig. 2 is a central cross sectional view taken on line 2—2 of Fig. 1 and in the direction of the arrows, the parts being shown in the neutral position. Fig. 3 is a cross sectional view taken on line 3—3 of Fig. 1 and in the direction of the arrows, said parts being again shown in the neutral position. Fig. 4 is a cross sectional view similar to Fig. 2 but shows the parts in one of the driving positions. Fig. 5 is a central cross sectional view taken at right angles to the view shown in Fig. 1. Fig. 6 is a perspective view of the simplified and unitary yielding driver.

In the drawings, there is illustrated a two-part differential housing 10 and 11 secured together by the usual means 12. The housing 10 and 11 provides three bearings, two of which are in alignment, and one of which is at right angles to said aligned bearings. In each of the aligned bearings is a shaft, herein designated by the numeral 13; while in the transverse bearing is positioned a driving shaft 14. The driving shaft 14 is supported in said transverse bearing by the usual anti-friction rollers 15; while the shafts 13 are supported in their bearings by the anti-friction rollers 16. Secured upon the terminating end of the shaft 14 within the differential housing 10—11 is a bevel gear 17 secured by the usual lock nut 18. The bevel gear 17 meshes with a ring gear 19 suitably secured to the differential mechanism for driving the same and the shafts 13. The bolts 20 and the locking ring 21 of the usual differential construction are herein utilized as well as the two hardened washers 22 and 23 separated by the soft washer 24. The washers 22 are associated with the aligned bearings of the housing 10—11 by the usual pins 25. The other hardened bearings 23 are normally associated with the usual differential mechanism by similar pins seatable in the openings 26. Herein the pins 27 are shown associated with the differential driving mechanism embodying the invention. The enclosing housing of the differential drive mechanism replaces the ordinary gear construction associated with the ring gear 19, and the device is so constructed that differential action is secured, as well as all the other actions heretofore outlined in the preceding paragraphs. The device is herein shown as associated with the parts of a Ford automobile.

The two-part cylindrical housing includes a main enclosing member 28 and a cover 29, each having a complementary flange 30. The cover is provided with an annular groove 31, and said groove is adapted to receive the projecting flange 30 of the cylindrical body 28. As shown clearly in Fig. 1 the flanges 30, with the ring gear 19, are secured together by the bolts 20. The cover 29 and the cylindrical housing 28 are each provided with a circular bearing portion 32, and said bearing portion rotatably supports a bearing sleeve portion 33 of a toothed plate 34. The toothed plate 34 with the bearing portion 33 is extended inwardly and is provided with a groove 35 adapted to receive a Woodruff key 36 of the axle 13, whereby each of the axles 13 is keyed to a toothed plate 34. The plate 34 is provided with a peripheral flange 37 and herein the inner circular face of said flange is cut away or provided with the gear teeth 38. Adjacent the plate 34 and rotatably supported on the inwardly extending portion of the bearing 33 thereof is a friction ring and carrier plate 39.

Reference will now be had to Figs. 1 and 6 wherein the driver element is shown in detail. The driver element consists of a hub portion 40 provided with radially extending fingers 41 which are longer than the radially extending fingers 42, said fingers being positioned axially in alignment with each other, and herein there is shown a pair of fingers 41 separated by a slot and a pair of fingers 42 separated by a similar slot. Upon the opposite side of the hub from the fingers 42 and 41 are substantially identical fingers which extend in the opposite direction. The axles 13 carry a bushing 43, and said bushing supports the hub 40 which is integral with the driving fingers 41 and 42.

By means of the slotted construction herein described for the driver element, the fingers will be somewhat resilient or yielding. However, if desired, these fingers may be stiff and non-yielding.

Reference will now be had to Fig. 1 wherein the cylinder 28 is shown provided with a pair of axially extending slots 44 adapted to receive the longer fingers 41 of the driver element. It will, of course, be understood that the slots 44 are closed by the cover plate 29.

The ring plate or carrier 39 is herein shown provided with a pair of oppositely positioned and rectangularly extending pins or pivots 45. Each pivot carries a rocker element 46, and said rocker element is arcuately shaped and each end terminates in one or more teeth 47. Thus, the ends of the rocker constitute a dog construction for engagement with the teeth 38 hereinbefore described. The pivots 45, see Fig. 5, are extended beyond the rocker 46 and provide a support for retaining in position a coiled spring 48, said coiled spring being positioned at its other end by a similarly positioned pivot pin 45 on an adjacent plate 39. It will be understood that the spring 48 exerts pressure through the rocker elements 46 upon the ring plate carrier 39 so that the same may be maintained in frictional engagement with the plate portion of the toothed plate 34. Herein the shafts 13 are shown terminating in substantially the center of the drive construction, and adjacent each end of said shafts is a locking ring 50, whereby the shafts and the several associated members are secured together.

While but half of the elements have been described, it will be understood that the other half of the mechanism is substantially identical to that heretofore described.

The operation of the device is as follows: Power is supplied through suitable means to the driving shaft 14, and by means of the pinion 17 and ring gear 19 the slotted cylindrical housing 28 is rotated. The outer ends of the main driving fingers 41 which extend into the driving slot 44 are engaged by the edges of said slots, as shown clearly in Fig. 4, and move the driver elements from the positions shown in Fig. 2 to the positions shown in Fig. 4. It will be remembered that Figs. 2 and 3 illustrate the parts in the neutral, non-driving or overrunning position; while Fig. 4 illustrates the parts in one of the reversible driving positions. If the driving fingers are resilient or yielding, the rotation of the driving cylinder 28 flexes certain of said finger ends, and when said fingers are flexed to their limit as associated with the power to be transmitted therethrough, said fingers rotate the carrier plate 39 through the engagement of the shorter finger 42 with the adjacent end of the rocker 46. If we assume that the driving cylinder is rotated in a clockwise direction, and we assume that the vehicle wheel supported by the axle 13 is stationary due to the inertia of the automobile, the peripherally toothed plate 34 is likewise stationary until moved by the power means. It will be remembered that the springs 48 provide for frictional resistance between the carrier ring 39 and the toothed plate 34. This slight frictional resistance causes a slight retardation in the rotation of the plate carrier 39; and with this retardation, the fingers 42 engage the adjacent ends of the rockers 46 and project the teeth 47 thereof into engagement with the teeth 38 of the carrier plate 34. Subsequent continued application of power through the driver element, illustrated in Fig. 6, causes the complete flexure of the fingers if the same are yielding and complete engagement of the tooth or teeth 47 with the tooth or teeth 38 on the plate 34, thereby transmitting power from the cylinder 28 to the axle 13. In this movement it will be understood that the opposite end of the rocker from that projected into engagement with the teeth 38 is retracted, see Fig. 4.

Should the driving fingers be relatively resilient or yielding, a cushioning driving action will be secured, in addition to the ordinary differential action which will now be described.

Should for any reason, such as in making a turn, one of the vehicle wheels travels faster than the other wheel, it will be noted that the slow wheel or the axle 13 which is revolving at a less angular velocity than the other axle is the one which receives the greater proportion of power. This, it is to be noted, is directly contrary to the ordinary differential where the slow axle receives little or no power. In this way power is applied with the present differential to that portion which requires the most power to propel the automobile.

In the overrunning movement the fast moving axle carries with it the toothed plate driven member 34 and in the initiatory overrunning movement of the toothed plate, the teeth 38 ride upon the back edge of the former driving teeth 47 and thereby disengage said teeth from the teeth 38 by tilting the rocker element 46 on its pivot 45 so that said element is moved into the neutral position, as shown in Figs. 2 and 3. Due to the frictional engagement between the ringed carrier plate 39 and the toothed driven plate 34, it would naturally be assumed that after the teeth 47 are removed from engagement with the teeth 38 and the rocker 46 neutrally positioned, that said slight frictional resistance would be sufficient to cause said plate to be carried around with the overrunning toothed plate 34. It would likewise be assumed thereupon that continued overrunning movement of the toothed plate 34 with the plate 39 would cause the opposite end of the rocker 46 to engage the idle reverse driving finger 42 and cause said rocker to be tilted on its pivot 45 and thereby project the reverse driving teeth 47 into engagement with the overrunning teeth 38 and thereby prevent further overrunning. However natural these movements might be and however correct this theoretical condition appears, nevertheless it has been experimentally determined that this action does not occur. In practice it is believed that the foregoing action does not occur, since in starting, the driving element and the driven element are opposed in their application of forces, and that together with the sudden application of power is sufficient to jerk or force the teeth 47 into engagement with the teeth 38. In the overrunning movement, however, it is to be noted that the driving element, while it transmits no power to the overrunning member is rotating in the same direction as the overrunning element, and does not have the power behind it that the driving element has in starting so that in the overrunning movement conditions are considerably different than in the starting or initiatory portion of the forward driving.
In the drawings there is illustrated a balanced construction for each driven member, thereby providing that the forces applied to the driven member will not be unbalanced. Further, it will be observed that the constructions for each driven member are similar, which also results in a balanced construction, and equal application of power when both driven members require equal power. It is to be further noted that in addition to the foregoing balanced and symmetrical construction, the parts are reversely constructed as well, thereby providing for reverse driving, and, of course, reverse differential action when necessary. Thus, when the driving element or ring gear 19 is driven in one direction, half of the parts are operative, and the other half are simultaneously movable into an inoperative position, see Fig. 4. When rotation of the ring gear is reversed from that shown in Fig. 4, the fingers 41 which appear to be straight are bent if the same are yielding into a position corresponding to that illustrated by the curved fingers 41 of said figure. Simultaneously therewith the corresponding shortened fingers 42 engage the opposite or reverse driving end of the rocker 46 and project the reverse driving dog or tooth of each of the rockers into engagement with the teeth 38 of the plates 34 to reversely rotate the axles 13. Simultaneously with this operation of the rocker arms, it will be understood that the forward driving teeth and the forward driving fingers 41 and 42 do
not become operative and the forward driv-
ing end of the rocker 46 is tilted into the retracted or inoperative position. Overrunning movement in the reverse direction is substantially similar to that described for the forward driving and overrunning condition, and, therefore, is here omitted.

While the invention has been described in great detail in the aforesaid specifications, the same is to be considered as illustrative and not restrictive in character, for several distinct modifications of the invention as herein illustrated have been constructed and successfully operated, and these several modifications, as well as others which will readily suggest themselves to those skilled in the art are all considered to be within the broad purview of this invention, as outlined by the appended claims.

The invention claimed is:

1. In a power transmitting mechanism, a peripherally toothed driven member, a carrier adjacent said member, means for frictionally associating said carrier and said driven member, a driver, and an integral toothed driving dog tiltably mounted on the carrier and movable into engagement with the peripheral teeth to drive the driven member.

2. In a power transmitting mechanism, a peripherally toothed driven member, a carrier adjacent said member, means for frictionally associating said carrier and said driven member, a driver, and an arcuate driving member having oppositely extending reversible driving teeth tiltably mounted on the carrier and movable into engagement with the peripheral teeth to reversibly drive the driven member.

3. In a power transmitting mechanism, a peripherally toothed driven member, a carrier adjacent said member, means for frictionally associating said carrier and said driven member, a driver, and a plurality of integral tooth driving dogs, each tiltably mounted on the carrier and simultaneously movable into engagement with the peripheral teeth to drive the driven member.

4. In a power transmitting mechanism, a peripherally toothed driven member, a carrier adjacent said member, means for frictionally associating said carrier and said driven member, a driver, and a plurality of arcuate driving members, each having oppositely extending reversible driving teeth and tiltably mounted on the carrier and movable into engagement with the peripheral teeth to reversibly drive the driven member.

5. In a power transmitting mechanism, a peripherally toothed driven member, a carrier adjacent said member, means for frictionally associating said carrier and said driven member, a driver having a hub and an integral radially extending driving finger, and a toothed driving dog tiltably mounted on the carrier and movable into engagement with the peripheral teeth to drive the driven member.

6. In a power transmitting mechanism, a peripherally toothed driven member, a carrier adjacent said member, means for frictionally associating said carrier and said driven member, a driver having a hub and a plurality of integral radially extending driving fingers, and a plurality of toothed driving dogs, each tiltably mounted on the carrier and each engageable by a finger and movable thereby into engagement with the peripheral teeth to drive the driven member.

7. In a power transmitting mechanism, a peripherally toothed driven member, a carrier adjacent said member, means for frictionally associating said carrier and said driven member, a driver having a hub and an integral radially extending driving finger, and an integral toothed driving dog tiltably mounted on the carrier and movable into engagement with the peripheral teeth to drive the driven member.

8. In a power transmitting mechanism, a peripherally toothed driven member, a carrier adjacent said member, means for frictionally associating said carrier and said driven member, a driver having a hub and a plurality of integral radially extending driving fingers, and a plurality of integral toothed driving dogs, each tiltably mounted on the carrier and each engageable by a finger and movable thereby into engagement with the peripheral teeth to drive the driven member.

9. In a power transmitting mechanism, a peripherally toothed driven member, a carrier adjacent said member, means for frictionally associating said carrier and said driven member, a driver having a hub and an integral radially extending driving finger, and an arcuate driving member having oppositely extending reversible driving teeth and tiltably mounted on the carrier and movable into engagement with the peripheral teeth to drive the driven member.

10. In a power transmitting mechanism, a peripherally toothed driven member, a carrier adjacent said member, means for frictionally associating said carrier and said driven member, a driver having a hub and a plurality of integral radially extending driving fingers, and a plurality of arcuate driving members, each having oppositely extending reversible driving teeth and each tiltably mounted on the carrier and movable into engagement with the peripheral teeth to drive the driven member.

11. In a power transmitting device, a pair of peripherally toothed axially aligned driven members, a carrier adjacent each driven member, driving means between said carriers, a toothed dog tiltably mounted on each carrier and movable into engagement with the peripheral teeth of the adjacent driven member by said driving means, and yielding means between said carriers for frictionally engaging each carrier with the adjacent driven member.

12. In a power transmitting device, a pair of peripherally toothed axially aligned driven members, a carrier adjacent each driven member, driving means between said carriers, a plurality of toothed dogs tiltably mounted on each carrier and movable into engagement with the peripheral teeth of the adjacent driven member by said driving means, and yielding means between said carriers for frictionally engaging each carrier with the adjacent driven member.

13. In a power transmitting mechanism as claimed in claim 12, the arrangement of the driving dogs in spaced relation with each other upon the carrier.

14. In a power transmitting device, a pair of peripherally toothed axially aligned driven members, a carrier adjacent each driven member, driving means between said carriers, an arcuate driving member having oppositely extending reversible driving teeth and tiltably mounted on each carrier and movable into engagement with the peripheral teeth of the adjacent driven member by said driving means, and yielding means between said carriers for frictionally engaging each carrier with the adjacent driven member.

15. In a power transmitting device, a pair of peripherally toothed axially aligned driven members, a carrier adjacent each driven member, driving means between said carriers, a plurality of arcuate driving members each having oppositely extending reversible driving teeth and tiltably mounted on each carrier and movable into engagement with the peripheral teeth of the adjacent driven member by said driving means, and yielding means between said carriers for frictionally engaging each carrier with the adjacent driven member.

16. In a power transmitting device, a pair of peripherally toothed axially aligned driven members, a carrier adjacent each driven member, driving means between said carriers, an integral toothed dog tiltably mounted on each carrier and movable into engagement with the peripheral teeth of the adjacent driven member by said driving means, and yielding means between said carriers for frictionally engaging each carrier with the adjacent driven member.

17. In a power transmitting device, a pair of peripherally toothed axially aligned driven members, a carrier adjacent each driven member, driving means between said carriers, a plurality of integral toothed dogs tiltably mounted on each carrier and movable into engagement with the peripheral teeth of the adjacent driven member by said driving means, and yielding means between said carriers for frictionally engaging each carrier with the adjacent driven member.

18. In a power transmitting device, a pair of peripherally toothed axially aligned driven members, a carrier adjacent each driven member, driving means between said carriers, a toothed dog tiltably mounted on each carrier and movable into engagement with the peripheral teeth of the adjacent driven member by said driving means, and spring means mounted at opposite ends on opposite pivotal supports between said carriers for frictionally engaging each carrier with the adjacent driven member.

19. In a power transmitting device, a pair of peripherally toothed axially aligned driven members, a carrier adjacent each driven member, driving means between said carriers, a plurality of toothed dogs tiltably mounted on each carrier and movable into engagement with the peripheral teeth of the adjacent driven member by said driving means, and spring means mounted at opposite ends on opposite pivotal supports between said carriers for frictionally engaging each carrier with the adjacent driven member.

20. In a power transmitting device, a pair of peripherally toothed axially aligned driven members, a carrier adjacent each driven member, driving means between said carriers, an arcuate driving member having oppositely extending reversible driving teeth and tiltably mounted on each carrier and movable into engagement with the peripheral teeth of the adjacent driven member by said driving means, and spring means mounted at opposite ends on opposite pivotal supports between said carriers for frictionally engaging each carrier with the adjacent driven member.

21. In a power transmitting device, a pair of peripherally toothed axially aligned driven members, a carrier adjacent each driven member, driving means between said carriers, a plurality of arcuate driving members each having oppositely extending reversible driving teeth and tiltably mounted on each carrier and movable into engagement with the peripheral teeth of the adjacent driven member by said driving means, and spring means mounted at opposite ends on opposite pivotal supports between said carriers for frictionally engaging each carrier with the adjacent driven member.

22. In a power transmitting device, a driving cylinder, a pair of peripherally toothed axially aligned driving members surrounded by the cylinder, a carrier adjacent each driven member, an integral driver for each driven member, including an extension associated with the cylinder, a driving portion, a toothed dog tiltably mounted on each carrier and movable into engagement with the peripheral teeth of the adjacent driven member, and yielding means between said carriers for frictionally engaging each carrier with the adjacent driven member.

23. In a power transmitting device, a driving cylinder, a pair of peripherally toothed axially aligned driving members surrounded by the cylinder, a carrier adjacent each driven member, an integral driver for each driven member, including an extension associated with the cylinder, a driving portion, a plurality of toothed dogs tiltably mounted on each carrier and movable into engagement with the peripheral teeth of the adjacent driven member, and yielding means between said carriers for frictionally engaging each carrier with the adjacent driven member.

24. In a power transmitting device, a driving cylinder, a pair of peripherally toothed axially aligned driving members surrounded by the cylinder, a carrier adjacent each driven member, an integral driver for each driven member, including an extension associated with the cylinder, a driving portion, an arcuate driving member having oppositely extending reversible driving teeth and tiltably mounted on each carrier and movable into engagement with the peripheral teeth of the adjacent driven member, and yielding means between said carriers for frictionally engaging each carrier with the adjacent driven member 25. In a power transmitting device, a driving cylinder, a pair of peripherally toothed axially aligned driving members surrounded by the cylinder, a carrier adjacent each driven member, an integral driver for each driven member, including an extension associated with the cylinder, a driving portion, a plurality of arcuate driving members having oppositely extending reversible driving teeth and tiltably mounted on each carrier and movable into engagement with the peripheral teeth of the adjacent driven member, and yielding means between said carriers for frictionally engaging each carrier with the adjacent driven member.

26. In a power transmitting device, a driving cylinder, a pair of peripherally toothed axially aligned driving members surrounded by the cylinder, a carrier adjacent each driven member, an integral driver for each driven member, including an extension associated with the cylinder, a driving portion, a toothed dog tiltably mounted on each carrier and movable into engagement with the peripheral teeth of the adjacent driven member, and spring means mounted at opposite ends on opposite pivotal supports between said carriers for frictionally engaging each carrier with the adjacent driven member.

27. In a power transmitting device, a driving cylinder, a pair of peripherally toothed axially aligned driving members surrounded by the cylinder, a carrier adjacent each driven member, an integral driver for each driven member, including an extension associated with the cylinder, a driving portion, a plurality of toothed dogs tiltably mounted on each carrier and movable into engagement with the peripheral teeth of the adjacent driven member, and spring means mounted at opposite ends on opposite pivotal supports between said carriers for frictionally engaging each carrier with the adjacent driven member.

28. In a power transmitting device, a driving cylinder, a pair of peripherally toothed axially aligned driving members surrounded by the cylinder, a carrier adjacent each driven member, an integral driver for each driven member, including an extension associated with the cylinder, a driving portion, an arcuate driving member having oppositely extending reversible driving teeth and tiltably mounted on each carrier and movable into engagement with the peripheral teeth of the adjacent driven member, and spring means mounted at opposite ends on opposite pivotal supports between said carriers for frictionally engaging each carrier with the adjacent driven member.

29. In a power transmitting device, a driving cylinder, a pair of peripherally toothed axially aligned driving members surrounded by the cylinder, a carrier adjacent each driven member, an integral driver for each driven member, including an extension associated with the cylinder, a driving portion, a plurality of arcuate driving members having oppositely extending reversible driving teeth and tiltably mounted on each carrier and movable into engagement with the peripheral teeth of the adjacent driven member, and spring means mounted at opposite ends on opposite pivotal supports between said carriers for frictionally engaging each carrier with the adjacent driven member.

In witness whereof, I have hereunto affixed my signature.

WILLIAM H. HARRIS.